Patented July 7, 1931

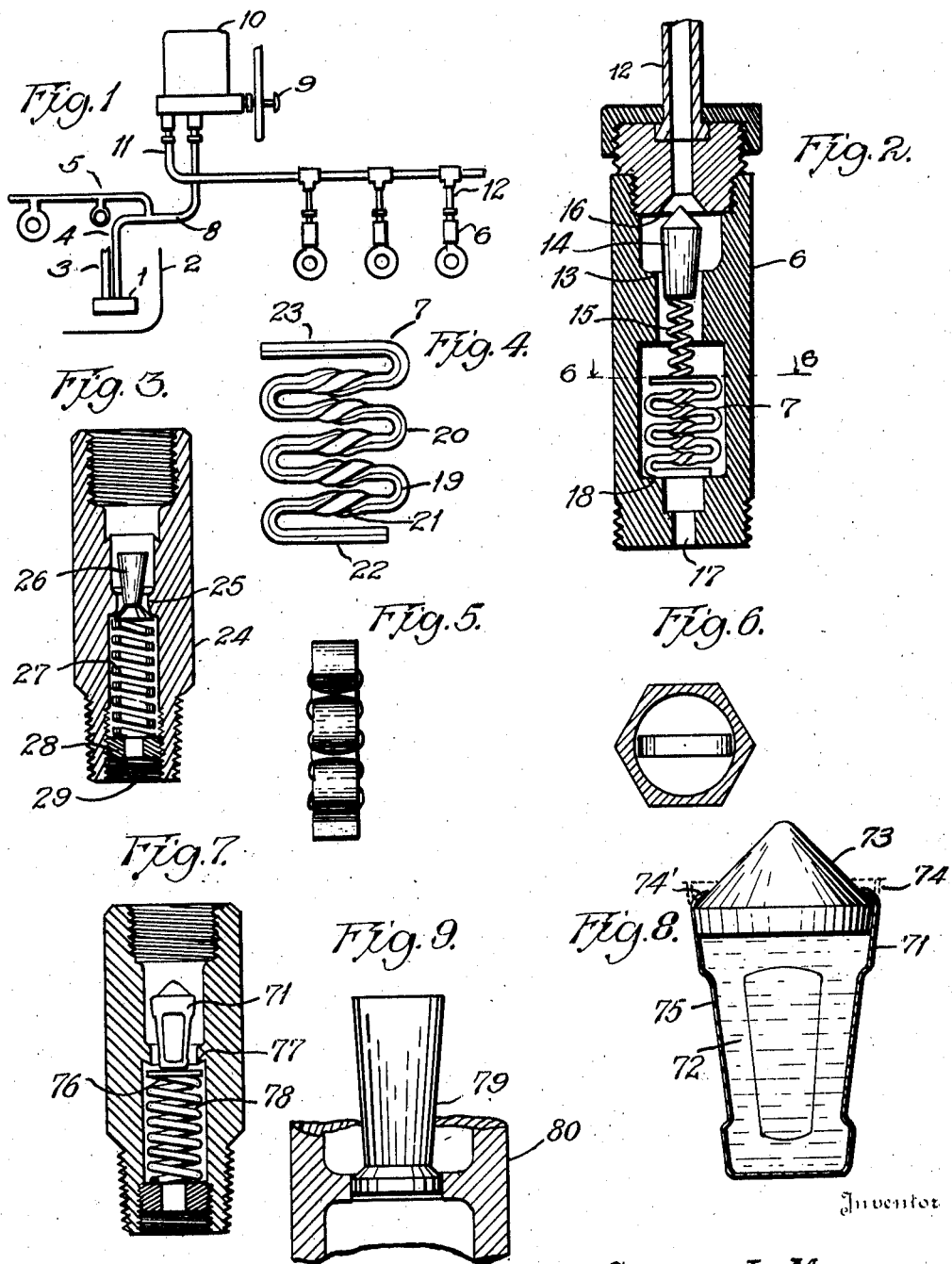

1,813,122

UNITED STATES PATENT OFFICE

GEORGE L. MOORE, OF CHICAGO, ILLINOIS, ASSIGNOR TO AUTO RESEARCH CORPORATION, A CORPORATION OF DELAWARE

LUBRICATING SYSTEM

Application filed May 28, 1926, Serial No. 112,189. Renewed April 29, 1929.

In lubricating systems of the pressure feed type in which a plurality of bearings are supplied from a central source under pressure two serious difficulties have been encountered. The first of these is that due to the fact that the bearings are at different heights and at considerably different distances from the pump, it has been impossible to insure proper proportioning of oil to the bearings to correspond with their respective needs. A means for overcoming this difficulty has been disclosed in my copending applications, Serial No. 74,432 filed December 10, 1925, which became Patent 1,587,849 and reissued June 14, 1927, as reissue Patent No. 16,655 and Serial No. 100,089 filed April 6, 1926. The second of the above mentioned difficulties is that due to the fact that lubricating systems are used under varying conditions of temperature, and the bearings are likely to receive too much oil at times when the temperature is high and the oil is thin, while when the temperature is low and the oil is thick and viscous the bearings receive too little oil and the more distant ones may receive none at all.

The object of the present invention is to provide a system in which both of these difficulties will be overcome by simple and practical means.

For a proper understanding of the invention reference is had to the accompanying drawings.

Figure 1 is a diagrammatic representation of a lubricating system of the type shown in my copending application No. 100,089.

Figure 2 is a view in section and elevation of a distributing valve, embodying the present invention and adapted for use in connection with any pressure system and particularly with a system of the type shown in Figure 1.

Figure 3 is a view in section and elevation of a slightly different embodiment of the present invention.

Figure 4 is an enlarged view of the element 7, shown in Figure 2.

Figure 5 is a side elevation of the element 7 shown in Figure 2.

Figure 6 is a sectional plan view of the embodiment shown in Figure 2, taken along the line 6—6.

Figure 7 is a view in sectional elevation of another embodiment of my invention.

Figure 8 is a sectional view of the element 71, shown in Figure 7, and

Figure 9 illustrates a further embodiment of the invention.

Referring to Figure 1, reference numeral 1 indicates a pump mounted in the crank case 2 of an internal combustion engine. This pump is driven by a shaft 3 and supplies oil through a conduit 4 to the system 5, which lubricates the engine. This pump also supplies oil to the conduit 8 under pressure. This conduit 8 is connected by means of a valve 9 to a tank 10, which in turn supplies the chassis bearings 12 through a conduit 11. The arrangement of the tank 10 and the valve 9 is such as illustrated in my copending application No. 100,089 and it will suffice for present purposes to state that the valve 9 normally closes communication between the conduit 8 and the tank and normally permits communication between the tank 10 and the conduit 11.

When the operator desires to lubricate the chassis he moves this valve to a position in which it closes communication between the tank and the conduit 11 and allows oil from the conduit 8 to flow into the tank against air pressure. When a predetermined quantity of oil has entered the tank the fluid pressure forces the valve 9 back to normal position in which communication with the conduit 8 is closed and the oil is allowed to flow out into the conduit 11 under the pressure of air in the tank 10.

At each bearing is located a flow control device or fitting. With reference to the embodiment shown in Figure 2 this fitting comprises a casing 6, which is connected to the main conduit by a branch conduit 12. Each of these fittings comprises a calibrated orifice 13 which is almost filled by a tapered plug 14. This tapered plug is normally held by a spring 15 in position to close the passage way through the fitting at the valve seat 16. When pressure is applied to the system the spring 15 yields and allows the oil to pass through the calibrated orifice 13 to the outlet 17 and to the bearing. It will be obvious that as the oil flows through the restricted orifice there will be a considerable pressure drop and that the plug 14 will move directly proportional to the pressure at that particular bearing. Since the plug 14 is tapered the orifice 13 becomes more restricted as the plug moves downwardly in response to the pressure and thus the flow will be substantially the same at varying degrees of pressure.

In order to compensate for varying degrees of temperature which result in a variation in viscosity of oil which would tend to affect the rate of flow I place a thermostatic element 7 between a shoulder 18 in the body 6 and the spring 15. This thermostatic element comprises a strip of two metals longitudinally joined as along the line 19 in Figure 4. These metals preferably have widely differing coefficients of expansion, such as for instance brass and steel, aluminum and steel or tin and steel. The metal is folded as at 20 and twisted a half turn between each fold, as at 21, in order to have the more expansible metal on the outside at each fold, for if this was not done the effect of temperature change on one side would be neutralized by the effect on the other side. It will be obvious that when the temperature of the thermostat is lowered the difference in the linear rate of change between the two metals will cause a tendency to unfold, with the result that the distance between the ends 22 and 23 of the thermostat were lengthened considerably. On an increase in temperature the opposite will occur. The result will be that the position of the tapered plug 14 corresponding to a given pressure will vary due to any change in temperature. When the temperature is high a given pressure will force the plug further into the orifice 13 and this orifice will then be more restricted and thus compensation is made for the decreased viscosity of the oil due to heat. In cold weather the given pressure will not push the plug as far into the orifice with the result that the opening is less restricted. It will be seen that a system having flow restricting devices of this type will deliver oil at substantially the same rate of flow under all conditions of temperature, even in a case where certain bearings are at a much higher temperature than others, and moreover the rate of flow will be substantially unaffected by variations in pressure or in the distance of the bearings from the source of pressure.

The effect of the device shown in Figure 2 to restrict the orifice upon a rise in temperature, or vice versa, may be increased if the body 6 of the drip plug is made of a metal having a lower coefficient of expansion than the plug 14, for instance this plug might be made of brass, zinc, tin or aluminum while the body 6 could be of steel.

A modification of this device is shown in Figure 3 in which 24 is the body of the drip plug, 25 is the restricted orifice and 26 is the plug having substantially the same functions as shown in the device of Figure 2, except that the plug seats at the bottom of the orifice instead of on a valve seat at the inlet to the drip plug. However, either restricting plug can be used with either the device in Figure 2 or Figure 3, the most important difference being in the substitution of a bi-metallic spring 27 having the functions of both a spring and a thermostat. This spring is made of a coiled strip, the strip being made of two metals, having different coefficients of expansion and coiled as shown; the length of the spring will change with changes in temperature. The tension of the spring for any position of the plug 26 will vary with the temperature and give the device the same functions as performed by both the spring and the thermostat, as shown in Figure 2.

An adjusting screw plug 28 is fitted into threads at the outlet 29 of the drip plug. By means of this screw plug the tension of the spring may be adjusted.

In the device shown in Figure 7 either a thermostatic spring or an ordinary spring may be used; the chief feature of this modification being that the restriction plug is replaced by a sheet metal capsule, such as shown in section in Figure 8. This capsule is formed of thin sheet metal and is filled with a fluid having a high coefficient of expansion, or with a gas under pressure. For instance, it may be filled with alcohol which has a very high coefficient of expansion or it may be filled with carbonated water, it being noted that carbon dioxide is much more soluble at a given pressure in water at low temperature than it is at high temperatures. The shell 72 of the plug is filled with the liquid and the plug 73 is inserted to close the top of the shell. The plug is of such size as to fit the tapered walls slightly below the top, leaving an edge 74, shown in the dotted lines, which may be turned over as shown at 74' to hold the plug in place and seal the liquid in the capsule. If desired a more perfect seal may be insured by soldering or plating. While the natural elasticity of the metal would in most cases be sufficient to allow the expansion of the fluid due to heat, if the walls of the capsule were left round and plain it is considerably preferable to provide one or more flats or corrugations 75, as this not only allows expansion without permanent deformation but due to the fact that oil flows fastest in the middle of a stream, it increases the effect of the restriction by tending to straighten out the corrugations. The use of this plug is the same as that of the corresponding plug in the other forms of the invention, and the end of the plug 73 may rest against the valve seat in the inlet as shown in Figure 2, or this valve seat may be dispensed with and a valve seat in the central part of the body member used, as shown in Figures 3 and 7 may be substituted. When this is done, the valve may be formed by an enlarged portion on the end of the capsule, or the valve may be simply a separate disk of sheet metal as shown at 76. These disks might also be made of linoleum, or similar material, but they are preferably made of sheet metal and faced with cork or oiled silk.

The responsiveness of such a liquid filled capsule as is shown in Figure 8 is much greater to a given degree of heat than a similar solid metal capsule, because the coefficient of expansion of certain liquids is very much greater than of any known metals or alloys, and the metal walls of the capsule can stretch to accommodate the expansion without permanent deformation, especially where corrugations or flats are provided so that as the liquid expands the capsule can assume a shape approaching more nearly to cylindrical form.

In the oils which are ordinarily used for lubricating the bearings of an automobile, the change in viscosity due to heat is very great, the change in one common grade of oil being about thirty to one between the points in temperature of zero and one hundred Fahrenheit. It will be obvious that if this grade of oil is used it will be necessary to have a correspondingly large change in the size of the outlets for the same change of temperature, and for that reason alone one of the devices which I have described for compensating for viscosity change might be so large as to be cumbersome, if made large enough to entirely compensate for the change. To avoid this difficulty, I contemplate using a combination of these devices in the same unit in installations which are likely to be exposed to great differences of temperature, or which are to be used with oils having a great viscosity change per unit of temperature change. For instance, in the device shown in Figure 2 I may use a plug 14 of the type shown in Figure 8, or this plug may be made of a metal having a high coefficient of expansion such as brass or zinc or tin or aluminum; the spring 15 could be of the type shown in Figure 3, and a thermostatic support for the spring may also be used. With a device thus constructed it will be obvious that the compensating effect will be the sum of the effects of all the devices so used, so that it will be by no means difficult to secure any desired degree of compensation. Of course under certain conditions it will be necessary to have but a small amount of compensation, and when this is the case I will select any one or any combination of these compensating devices which seem to suit the problem in hand. In the embodiment of Fig. 9 the tapered plug 79 by means of a cylindrical valve upon its lower portion cooperates with a cylindrical valve seat in the body 80.

I believe that the above description of my invention is so full and clear as to enable any mechanic skilled in the art to make and use the device. Since it is obvious that the invention is capable of many embodiments, I do not wish to limit myself in its use except as indicated in the following claims.

I claim:

1. In a pressure lubricating system of the type in which a plurality of bearings is supplied with lubricant under pressure from a central source and in which the bearings are located at varying heights and varying distances from the source and which systems are exposed to varying temperatures; a plurality of identically constructed and interchangeable flow control devices, one at each bearing and pressure and temperature responsive means in said flow control devices whereby the amount of oil discharged at each bearing is substantially equal to the amount discharged at every other bearing, regardless of varying pressure and temperature conditions at the bearings.

2. A chassis lubricating system for automobiles of the type having a constantly operated pump for lubricating the automobile engine; an air chamber having an inlet and an outlet, a conduit from said pump to the inlet of said chamber, valve means controlling the inlet and outlet of said chamber and adapted to segregate a predetermined quantity of lubricant in said chamber under pressure and thereafter to allow said lubricant to be discharged through said outlet, conduit means connecting said outlet with a plurality of bearings, a flow resistance at each of said bearings and means for varying said resistance with the temperature.

3. A device as claimed in claim 2, having thermostatic means at each of said bearings for automatically varying said resistance as the temperature varies.

4. A device as claimed in claim 2, having means at each of said bearings for varying said resistance inversely with the pressure at which the oil is supplied to that bearing.

5. In a device for receiving and discharging viscous fluids under pressure, and adapted to be subjected to varying pressures and temperatures, means to compensate for the effect of varying temperatures on the viscosity of the fluid, and means to compensate for variations in pressure, whereby the fluid will be discharged at substantially the same rate regardless of either the temperature or the pressure at which the fluid is received.

6. In a device of the class described, an inlet chamber adapted to receive oil under pressure, an outlet chamber, a flow restricting member having a tapered portion extending from said inlet chamber toward said outlet chamber, a restricted orifice between said inlet chamber and said outlet chamber and adapted to receive said tapered portion, a valve seat for limiting the movement of said flow restricting member toward said inlet, a thermostatic spring for urging said member toward said valve seat, said thermostatic spring having means whereby to vary the tension of said spring upon a change in temperature.

7. In a device of the class described, an inlet chamber adapted to receive oil under pressure, a discharge port and an outlet chamber, a flow restricting member having a tapered portion extending from said inlet chamber through said port, a portion of said member being exposed to the oil pressure in each of said chambers, the large end of said taper being toward the inlet chamber, whereby the oil pressure in the inlet chamber tends to move the tapered member in a direction to further restrict the port, spring means tending to move said member toward said inlet, and thermostatic means for varying the tension of said spring.

8. In a lubricating system a flow controlling device, comprising a body portion having an inlet and an outlet connected by a restricted orifice, a tapered plug in said orifice and a bi-metallic spring for biasing said plug in one direction.

9. In a lubricating system a body member having a low coefficient of expansion, an inlet chamber and an outlet chamber in said body member and connected by a restricted orifice, a restricting member having a high coefficient of expansion and a tapered portion thereon and adapted to project into said orifice, a valve seat and a valve adapted to control communication through said body member, a spring for urging said valve to its seat and thermostatic means for varying the tension of said spring.

10. A heat responsive device comprising a pair of metallic strips longitudinally joined, said strips being formed of metals having different coefficients of expansion, said member having a plurality of folds therein, one of said metals being at the inside of one of said folds and a half turn twist in said member between each two of said folds, whereby the same metal will be inside at each of said folds.

11. A heat responsive device comprising a pair of metallic strips, longitudinally joined together, a plurality of bends at substantially equal distances along the length of said strip, each of said bends being opposite in direction to the adjacent bend or bends, the axis of curvature of said bend being parallel to the plane of contact at the bends.

12. In a lubricating system a plurality of bearings, a conduit for supplying lubricant to said bearings, an outwardly opening spring pressed check valve at each bearing and thermostatic means for varying the pressure exerted by said spring.

13. In a lubricating system a plurality of bearings, conduit means for supplying said bearings with lubricant and having an outlet at each bearing, a spring pressed check valve at each outlet normally closing the same and a screw threaded plug forming an adjustable spring seat for said check valve spring, and heat responsive means in each of said outlets for controlling the flow of lubricant when said check valves are open.

14. In a lubricating system a body member having an inlet chamber and an outlet chamber connected by a restricted orifice, a shoulder portion between said outlet chamber and said orifice and forming a valve seat, an expansible tapered plug adapted to project into said orifice and a valve to coact with said seat.

15. A device as claimed in claim 14 and a spring for seating said valve and means for adjusting the tension for said spring.

16. A device as claimed in claim 14 and a bi-metallic spring for seating said valve.

17. A device as claimed in claim 14, a thermostatic spring for seating said valve and other means for adjusting the tension of said spring.

18. In a lubricating system a flow resistance comprising an orifice and a highly expansible tapered plug adapted to be projected into said orifice by the pressure of flow.

19. In a lubricating system, a source of pressure, a system of conduits adapted to receive lubricant from said source and to convey it to the parts to be lubricated, and a heat responsive flow control device at each part adapted to control the flow of oil from said source to that bearing.

20. In a device of the class described, a body member having a passage therethrough and formed of a material having a comparatively low coefficient of expansion, a flow obstructing member in said passage formed of material having a comparatively high coefficient of expansion, a check valve seat in said passage, a check valve on one end of said obstructing member, and a spring for normally holding said check valve seated.

21. In a device of the class described, a body member having a conduit therethrough, said conduit being adapted to receive and discharge a viscous fluid under pressure, and means in said conduit to compensate for variations in either pressure or viscosity or both, whereby to insure a substantially uniform rate of discharge.

22. In a lubricating system, a plurality of bearings to be lubricated, and a flow control at each bearing comprising an orifice and a highly expansible plug within said orifice and adapted to restrict the flow therethrough.

23. In a device of the class described a steel body member having an outlet port therein and a brass plug partially filling said port, a check valve seat in said body, spring means biasing said brass plug in one direction, and spring means for normally closing said check valve.

24. In a flow controlling device, an inlet adapted to receive oil under pressure, an outlet, a flow restricting member, a restricted orifice between said inlet chamber and said outlet chamber and adapted to receive said member, a thermostatic spring for urging said member toward said valve seat, said thermostatic spring having means whereby to vary the tension of said spring upon a change in temperature.

25. In a lubricating system, a body member, an inlet and an outlet in said body member and connected by a restricted orifice, a restricting member, a valve seat and a valve adapted to control communication through said body member, a spring for urging said valve to its seat and thermostatic means for varying the tension of said spring.

GEORGE L. MOORE.